US012747768B2

(12) United States Patent
Leclercq et al.

(10) Patent No.: US 12,747,768 B2
(45) Date of Patent: Sep. 29, 2026

(54) METERING NEEDLE FOR OLEO-PNEUMATIC-TYPE SHOCK ABSORBER

(71) Applicant: SAFRAN LANDING SYSTEMS, Velizy-Villacoublay (FR)

(72) Inventors: Sylvain Leclercq, Moissy-Cramayel (FR); Mathieu Joubert, Moissy-Cramayel (FR); Franck Lecuyer, Moissy-Cramayel (FR); Quentin Roirand, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 252 days.

(21) Appl. No.: 17/772,858

(22) PCT Filed: Oct. 27, 2020

(86) PCT No.: PCT/EP2020/080206

§ 371 (c)(1),
(2) Date: Apr. 28, 2022

(87) PCT Pub. No.: WO2021/083913

PCT Pub. Date: May 6, 2021

(65) Prior Publication Data

US 2022/0364627 A1 Nov. 17, 2022

(30) Foreign Application Priority Data

Oct. 29, 2019 (FR) ........................................ 1912123

(51) Int. Cl.

*B64C 25/60* (2006.01)
*F16F 9/342* (2006.01)
*F16F 9/06* (2006.01)

(52) U.S. Cl.

CPC .............. *F16F 9/342* (2013.01); *B64C 25/60* (2013.01); *F16F 9/061* (2013.01)

(58) Field of Classification Search

CPC .................................. F16F 9/342; F16F 9/061
See application file for complete search history.

(56) References Cited

U.S. PATENT DOCUMENTS 2,591,230 A * 4/1952 Joseph, V .................. F16J 9/08 277/467
2019/0309817 A1* 10/2019 Juracek ................. F16F 9/3485

FOREIGN PATENT DOCUMENTS

CN 1726144 A * 1/2006 ............ B60T 11/232
DE 10 2004 061 989 A1 7/2006

(Continued)

OTHER PUBLICATIONS

International Search Report of PCT/EP2020/080206 dated Nov. 23, 2020 [PCT/ISA/210].

(Continued)

*Primary Examiner* — Melody M Burch
(74) *Attorney, Agent, or Firm* — Sughrue Mion, PLLC

(57) ABSTRACT

A metering needle for an oleo-pneumatic-type shock absorber includes a base made of thermoplastic material, from which projects a rod arranged to control the flow of a hydraulic fluid through an orifice. The base has an arched bottom for withstanding pressure forces, in which is mounted an insert arranged to mechanically reinforce the arched bottom and distribute the pressure forces evenly.

7 Claims, 2 Drawing Sheets

(56) References Cited

FOREIGN PATENT DOCUMENTS

| | | | | | |
|---|---|---|---|---|---|
| EP | 1 300 264 | A2 | | 4/2003 | |
| EP | 3418190 | A1 | * | 12/2018 | ........... B64C 25/001 |
| EP | 3505788 | A1 | * | 7/2019 | ............. B64C 25/60 |
| FR | 2671158 | A1 | * | 7/1992 | .............. F16L 35/00 |
| FR | 2 999 529 | A1 | | 6/2014 | |
| FR | 2999528 | A1 | * | 6/2014 | ............. B64C 25/60 |
| GB | 2255150 | A | * | 10/1992 | .............. F16F 9/061 |
| WO | 2013/075210 | A1 | | 5/2013 | |

OTHER PUBLICATIONS

Written Opinion of PCT/EP2020/080206 dated Nov. 23, 2020 [PCT/ISA/237].

* cited by examiner

METERING NEEDLE FOR OLEO-PNEUMATIC-TYPE SHOCK ABSORBER

This application is a National Stage of International Application No. PCT/EP2020/080206, filed Oct. 27, 2020, claiming priority to French Patent Application No. 1912123, filed Oct. 29, 2019, the entire contents of each of which being herein incorporated by reference in their entireties.

BACKGROUND OF THE INVENTION

An aircraft lander generally has an oleo-pneumatic shock absorber which allows to ensure the stabilisation and the control of the movements of the aircraft, in particular during taxiing and landing phases. The oleo-pneumatic shock absorber comprises a box in which a cylinder is mounted to slide. The cylinder has at its lower end, one or more wheels allowing the aircraft to rest on the ground.

The box and the cylinder together define an inner volume separated into two chambers by a diaphragm. One of the chambers is filled with a hydraulic fluid, while the other chamber is filled with the same hydraulic fluid and a pressurised gas. The diaphragm has a central orifice through which the hydraulic fluid can flow.

The flow of the hydraulic fluid through the orifice is controlled by a metering needle arranged to move through said orifice when the cylinder slides inside the box.

The metering needle traditionally comprises a base from which projects a rod received inside the central orifice, the base having an arched bottom to withstand the pressure forces exerted by the hydraulic fluid.

The metering needle is generally made of metal. However, the manufacture of such a needle involves expensive and long machining operations. What is more, the manufacture by machining involves minimum thicknesses which prevent reducing the mass of metal metering needles, the latter thus being oversized in view of the forces that they undergo.

Metering needles made of thermoplastic material are known, this material therefore offering a decrease of the mass and a reduction of the durations and costs of the machining operations, while meeting the mechanical performances necessary for the correct operation of the shock absorber.

However, if the manufacture by injection allows to optimise the forms of the metering needles, in particular to decrease their mass, it can also limit the improvement of their mechanical performances. Indeed, a plastic metering needle, the structure of which would be optimised to improve its performances, would have confined zones that it would be difficult, even impossible, to achieve by injection.

AIM OF THE INVENTION

The invention therefore aims to propose a metering needle allowing to at least partially prevent the abovementioned disadvantages.

SUMMARY OF THE INVENTION

To this end, a metering needle for an oleo-pneumatic-type shock absorber is proposed, comprising a base made of thermoplastic material from which projects a rod arranged to control a flow of a hydraulic fluid through an orifice.

According to the invention, the base has an arched bottom to withstand pressure forces and in which is added an insert arranged to mechanically reinforce the bottom and distribute the pressure forces evenly.

The arrangement of such an insert allows to repel the mechanical performances of a metering needle made mainly of thermoplastic material.

Particularly, the insert is made of metal, preferably steel or aluminium.

According to a first embodiment of the invention, the insert is a cylindrical bush housed in the bottom of the base.

According to a particular characteristic, the sleeve is press-fitted on an injection gate of the base. The injection base subsequently forms a pin for centring the bush in the bottom of the base.

Particularly, an outer surface of the bush engages with an inner surface of a stiffening ring of the bottom of the base.

Advantageously, the base and the rod belong to one single part made of thermoplastic material.

According to a second embodiment of the invention, the insert is a tubular strip passing through the base and arranged to receive an end of the rod.

The strip thus allows to reinforce both the wing root of the rod in the base, but also the base itself around said wing root.

According to a particular characteristic, the rod is connected to the strip via a removable fixing means, like for example, a pin, a rush, a "circlip"-type elastic segment or a threaded connection.

The invention also relates to an oleo-pneumatic-type shock absorber comprising such a metering needle.

The invention also relates to an aircraft lander comprising such a shock absorber.

The invention further relates to an aircraft comprising such a lander.

BRIEF DESCRIPTION OF THE DRAWINGS

The invention will be best understood in the light of the following description, which is purely illustrative and non-limiting, and must be read regarding the appended drawings, among which.

DETAILED DESCRIPTION OF THE INVENTION

Figure 1:
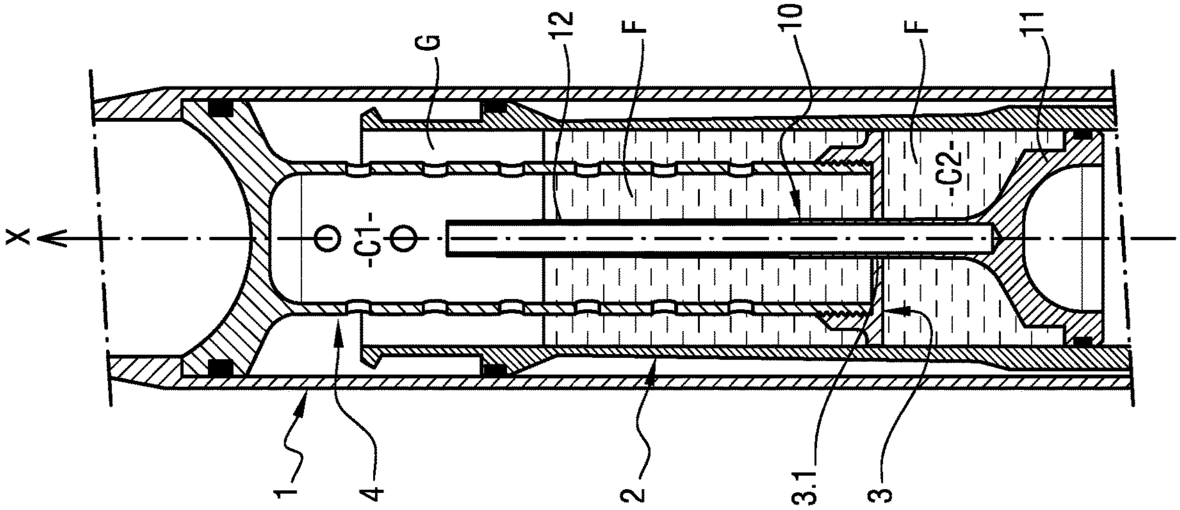
FIG. 1 is a partial cross-sectional view of an aircraft lander shock absorber known per se, comprising a metering needle made of steel.

FIG. 1 represents an oleo-pneumatic-type aircraft lander shock absorber. In a manner known per se, the shock absorber has a box 1 in which a cylinder 2 is mouted to slide along a vertical axis X between a retracted position and an output position. A lower end of the cylinder 2 is arranged to receive an axle or a bogie holding one or more wheels.

A diaphragm 3 separates the inside of the chamber 2 into a first chamber C1 filled with a hydraulic fluid F and a pressurised gas and a second chamber C2 filled with the hydraulic fluid F. The diaphragm 3 is held by a diaphragm holder tube 4, of which an upper end is directly added onto a ceiling of the box 1.

The diaphragm 3 is provided with a calibrated orifice 3.1 allowing the hydraulic fluid F to flow from the first chamber C1 to the second chamber C2 or vice versa, from the second chamber C2 to the first chamber C1.

Figure 2:
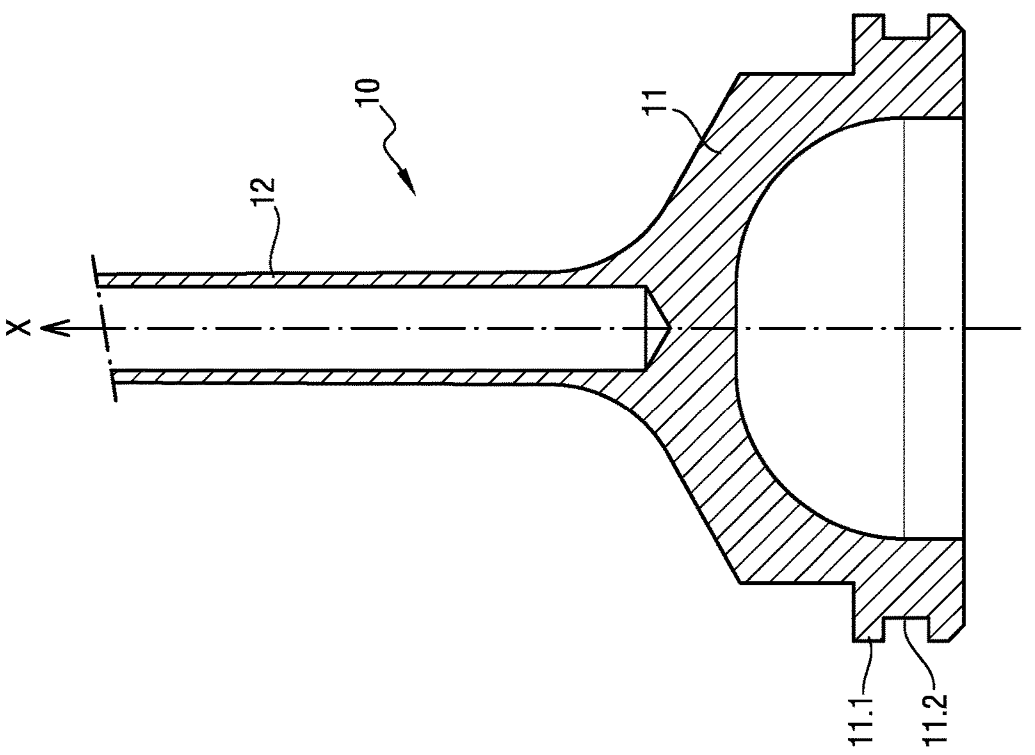
FIG. 2 is a detailed view of the metering needle illustrated in FIG. 1.

The flow of the hydraulic fluid F through the orifice 3.1 is controlled in a manner known per se, by a metering needle 10. In reference to FIG. 2, the metering needle 10 has a base 11 from which projects a rod 12 arranged to move through the orifice 3.1 of the diaphragm when the cylinder 2 slides inside the box 1.

The base 11 has an arched bottom and has a cylindrical seat 11.1 arranged to be able to be adjusted in a homologous cylindrical seat arranged in the cylinder 2. The cylindrical seat 11.1 comprises a groove 11.2 to receive a seal (not represented).

The rod 12 is here mainly truncated, which allows to control the flow rate of the hydraulic fluid F passing through the orifice 3.1 according to a sinking of the cylinder 2 into the box 1. In a variant, the rod 12 can comprise a plurality of openings allowing the hydraulic fluid F to pass through the rod 12.

The base 11 and the rod 12 belong here to one single part made of metal.

All this is well-known and is only reminded of to make the invention better understood.

Figure 3:
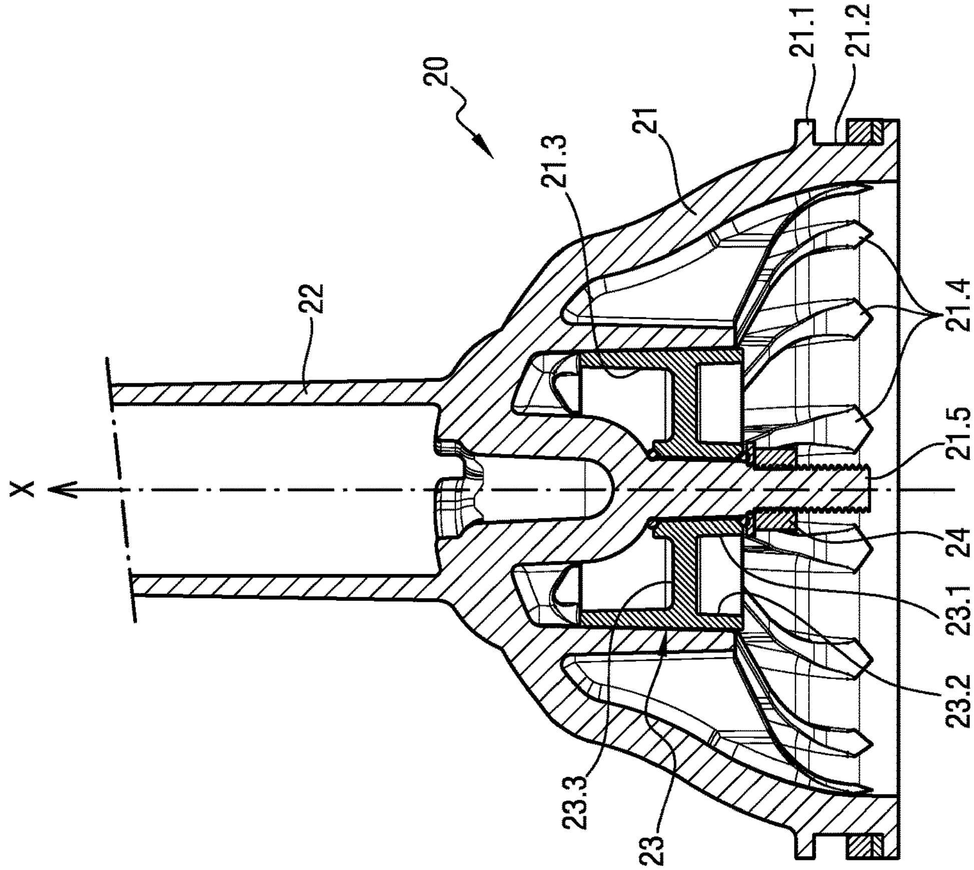
FIG. 3 is a detailed view of a metering needle according to a first embodiment of the invention.

FIG. 3 illustrates a metering needle 20 according to a first embodiment of the invention. The metering needle 20 has a general form, similar to that of the metering needle 10 illustrated in FIG. 2.

Thus, the metering needle 20 has a flared base 21, from which projects a hollow, truncated rod 22 arranged to move through the orifice 3.1 of the diaphragm 3 when the cylinder 2 slides inside the box 1.

The base 21 has a cylindrical seat 21.1 arranged to be able to be adjusted in the homologous cylindrical seat arranged in the cylinder 2. The cylindrical seat 21.1 comprises a groove 21.2 intended to receive a seal (not represented).

Moreover, the base 21 has a bottom forming an axisymmetrical arch with convexity rotated towards the free end of the rod 22 and consolidated inside by a dual stiffening system comprising, on the one hand, an intermediate ring 21.3 centred on the axis X, and on the other hand, a network of radial ridges 21.4 connecting the cylindrical seat 21.1 to the intermediate ring 21.3.

The base 21 and the rod 22 belong here to one single part made of thermoplastic material.

The intermediate ring 21.3 and the radial ridges 21.4 allow to stabilise the arch which can subsequently resist significant pressure forces, while having an arrangement of optimal material contributing to a lightening in mass of the metering needle.

The metering needle 20 moreover comprises a bush 20 housed inside an inner volume delimited by the intermediate ring 21.3. The bush 23 comprises an inner tube 23.1 and an outer tube 23.2 coaxial to one another and connected together by a radial wall 23.3. An outer surface of the outer tube 23.2 of the bush 23 is shaped to engage with a substantially truncated inner surface of the intermediate ring 21.3, while an inner surface of the inner tube 23.1 of the bush 23 is shaped to engage with a substantially truncated outer surface of an injection gate 21.5 of the metering needle 20. The injection gate 21.5 extends along the axis X and forms a centring pin on which is press-fitted the bush 23. The bush 23 is fixed on the injection gate 21.5 via a nut 24 screwed on the free end of said injection gate 21.5 to bear on an edge of the inner tube 23.1 of the bush 23.

The bush 23 is here made of metal, preferably steel or aluminium.

The bush 23 forms an insert added in the arch of the metering needle 20 and allows a better distribution and transfer of forces exerted by the hydraulic fluid F and the gas G on the base 21, in particular during the compression of the shock absorber. The bush 23 thus allows to improve the mechanical performances of the base 21 and of the rod 22.

Figure 4:
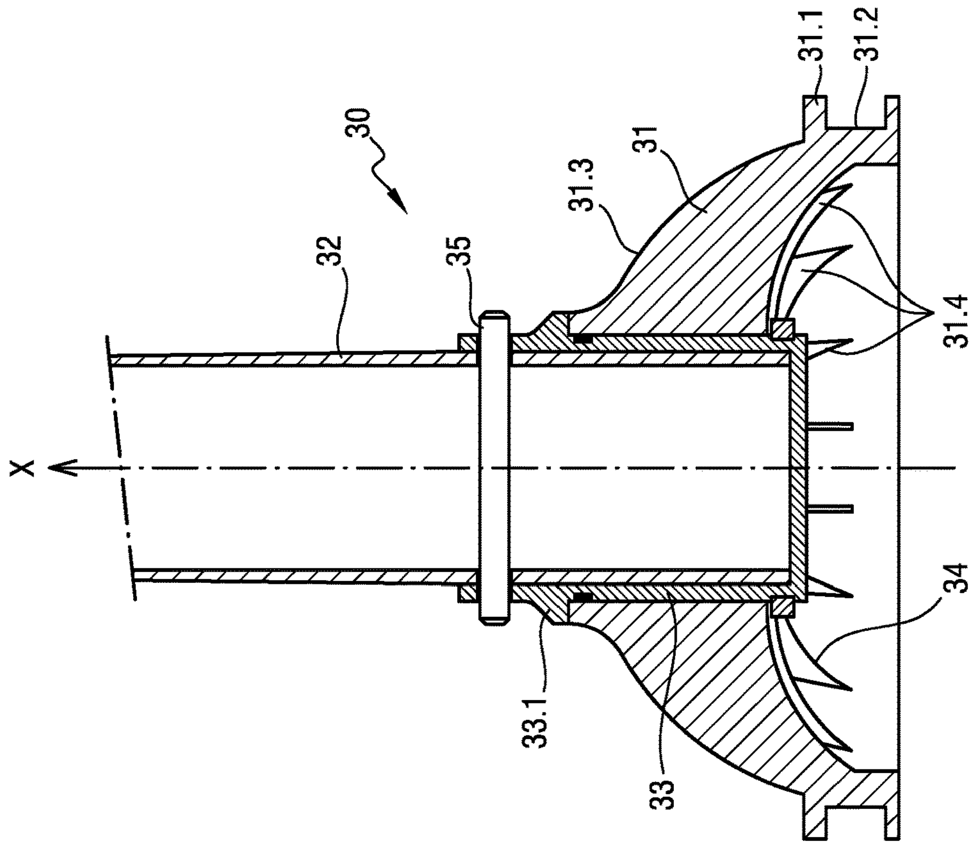
FIG. 4 is a detailed view of a metering needle according to a second embodiment of the invention.

FIG. 4 illustrates a metering needle 30 according to a second embodiment of the invention.

The metering needle 30 has, similarly to the metering needle 20, a flared base 31 made of thermoplastic material forming a bottom forming an axisymmetrical arch. The base 31 comprises in the lower part, in its more flared part, an outer cylindrical seat 31.1 which is arranged to be able to be fitted in the homologous cylindrical seat arranged in the cylinder 2 and which comprises a groove 31.2 intended to receive a seal (not represented). The base 31 comprises, in the upper part, an inner cylindrical seat 31.3 which is substantially coaxial to the outer cylindrical seat 31.1 and leads to either side of the base 31. The base 31 is consolidated inside by a network of radial ridges 31.4 connecting the outer cylindrical seat 31.1 to the inner cylindrical seat 31.3.

In the inner cylindrical seat 31.3 is added to a tubular strip 33. The strip 33 has, in the upper part, an outer shoulder 33.1 bearing against an upper edge of the inner cylindrical seat 31.3, and in the lower part, a threaded portion arranged to engage with a nut 34 bearing against a lower edge of said inner cylindrical seat 31.3 so as to secure the strip 33 to the base 31.

The strip 33 defines an inner volume in which is added a lower end of a rod 32 extending along the axis X and intended to more or less block the orifice 3.1 of the diaphragm 3 according to its sinking into this orifice. The lower end of the rod 32 engages with an inner peripheral surface of the strip 33 and is connected to said strip 33 by a pin 35 simultaneously entirely passing through the strip 33 and the lower end of the rod 32.

The strip 33 forms a mechanical reinforcement insert added in the base 31 of the metering needle 30 to reinforce the base 31 and the wing root of the rod 32 in the base 31. It allows a better distribution and transfer of forces exerted by the hydraulic fluid F and the gas G on the base 31, in particular during the compression of the shock absorber. This mechanical reinforcement is improved by the presence of the rod 32.

The strip 33 and the rod 32 are here made of metal, preferably steel or aluminium.

The arrangement of the metering needle 30 allows, compared for example with the metering needle 10, to reduce the mass of the metering needle and to simplify its manufacture, while guaranteeing it the mechanical performances necessary for the correct operation of the shock absorber.

Of course, the invention is not limited to the embodiments described, but comprises any variant entering into the scope of the invention such as defined by the claims.

Although the strip is here connected to the rod via a pin, other types of fixing can be considered (screwing, rush, “circlip”-type elastic segment, gluing, etc.), removable or not.

The geometry and the dimensions of the bush and of the strip can be different from those illustrated.

The strip can have its two ends open or one of its ends can be closed by a wall, forming for example, an axial stop for the rod.

The invention claimed is:

1. An oleo-pneumatic shock absorber comprising a metering needle, a diaphragm holder tube and a diaphragm held by the diaphragm holder tube, the metering needle comprising a base made of thermoplastic material from which projects a rod arranged to control a flow of a hydraulic fluid through an orifice of the diaphragm, the base having a bottom delimiting an external face of the metering needle and forming an axisymmetrical arch with convexity rotated towards a free end of the rod to withstand pressure forces and in which is inserted and fastened an insert arranged to mechanically reinforce the arched bottom and distribute the pressure forces evenly wherein the insert is a cylindrical bush housed in the arched bottom of the base, and the cylindrical bush is press-fitted on an injection sprue of the base.

2. The oleo-pneumatic shock absorber according to claim 1, wherein the insert is made of metal.

3. The oleo-pneumatic shock absorber according to claim 1, wherein an outer surface of the bush engages with an inner surface of a stiffening ring of the arched bottom of the base.

4. The oleo-pneumatic shock absorber according to claim 1, wherein the base and the rod belong to one single part made of the thermoplastic material.

5. An aircraft lander comprising the oleo-pneumatic shock absorber according to claim 1.

6. An aircraft comprising the aircraft lander according to claim 5.

7. The oleo-pneumatic shock absorber according to claim 2, wherein the metal comprises steel or aluminium.

* * * * *